United States Patent
Diedrich et al.

(10) Patent No.: US 9,720,680 B2
(45) Date of Patent: Aug. 1, 2017

(54) METHODS AND APPARATUS FOR WIRELESSLY UPDATING VEHICLE SYSTEMS

(71) Applicant: Honda Motor Co., Ltd., Tokyo (JP)

(72) Inventors: Nathaniel W. Diedrich, Long Beach, CA (US); Timothy R. Jones, La Mirada, CA (US); Richard C. Shannon, Lake Elsinore, CA (US); Guillaume Ouellette-Berruel, Toronto (CA); David E. Speck, Rancho Palos Verdes, CA (US); John I. Rodenbaugh, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/807,627

(22) Filed: Jul. 23, 2015

(65) Prior Publication Data

US 2017/0024201 A1    Jan. 26, 2017

(51) Int. Cl.
| | |
|---|---|
| G06F 9/44 | (2006.01) |
| G06F 9/445 | (2006.01) |
| H04L 29/08 | (2006.01) |
| H04B 1/3822 | (2015.01) |

(52) U.S. Cl.
CPC ............ *G06F 8/65* (2013.01); *H04B 1/3822* (2013.01); *H04L 67/12* (2013.01); *H04L 67/34* (2013.01)

(58) Field of Classification Search
None
See application file for complete search history.

(56) References Cited

U.S. PATENT DOCUMENTS

| | | |
|---|---|---|
| 6,438,468 B1 | 8/2002 | Muxlow et al. |
| 6,647,322 B1 | 11/2003 | Hayashi et al. |
| 7,366,589 B2 | 4/2008 | Habermas |
| 7,506,309 B2 | 3/2009 | Schaefer |
| 7,676,804 B2 | 3/2010 | Ferguson et al. |
| 8,290,659 B2 | 10/2012 | Asano |
| 8,332,838 B2 | 12/2012 | Matlin |
| 8,561,054 B2 | 10/2013 | Smirnov et al. |

(Continued)

OTHER PUBLICATIONS

Dimatteo et al., "Cellular Traffic Offloading through WiFi Networks", Eighth IEEE International Conferences on Mobile Ad-Hoc and Sensor Systems, 2011, pp. 192-201.*

*Primary Examiner* — H S Sough
*Assistant Examiner* — Timothy Duncan
(74) *Attorney, Agent, or Firm* — Kenealy Vaidya LLP (57) ABSTRACT

Some embodiments are directed to a processor based control system for enabling users to configure implementation of software updates to a vehicle system. The system can include a processor based controller that is configured to perform a first searching step that includes searching for software updates to the system, and a second downloading step that includes downloading software updates to the system that are discovered in the first searching step. The processor based controller can be configured so that each of the first searching step and the second downloading step can be implemented in either an automatic mode or a manual mode. The system can also include a user interface that is configured to enable each of the first searching step and the second downloading step to be manually set in either the automatic mode or the manual mode.

18 Claims, 7 Drawing Sheets

(56) References Cited

U.S. PATENT DOCUMENTS

| | | |
|---|---|---|
| 8,768,537 B2 | 7/2014 | Kim et al. |
| 2003/0135858 A1 | 7/2003 | Nemoto |
| 2004/0064812 A1* | 4/2004 | Tachiyama ............... G06F 8/65 717/170 |
| 2004/0214599 A1 | 10/2004 | Ogino |
| 2005/0090939 A1 | 4/2005 | Mills et al. |
| 2005/0090941 A1 | 4/2005 | Stefan et al. |
| 2006/0018479 A1 | 1/2006 | Chen |
| 2008/0007120 A1 | 1/2008 | Weyl et al. |
| 2008/0086240 A1 | 4/2008 | Breed |
| 2009/0119657 A1 | 5/2009 | Link, II |
| 2009/0133012 A1* | 5/2009 | Shih ........................ G06F 8/65 717/169 |
| 2009/0300595 A1 | 12/2009 | Moran et al. |
| 2010/0082559 A1 | 4/2010 | Sumcad et al. |
| 2011/0083128 A1 | 4/2011 | Hoch et al. |
| 2011/0197187 A1 | 8/2011 | Roh |
| 2011/0225259 A1 | 9/2011 | Quinn et al. |
| 2011/0320089 A1 | 12/2011 | Lewis |
| 2012/0030470 A1 | 2/2012 | Jdanov et al. |
| 2012/0030512 A1 | 2/2012 | Wadhwa et al. |
| 2012/0167071 A1 | 6/2012 | Paek |
| 2012/0204166 A1 | 8/2012 | Ichihara |
| 2013/0030639 A1 | 1/2013 | Gasperson |
| 2013/0031540 A1 | 1/2013 | Throop et al. |
| 2013/0117739 A1 | 5/2013 | Mueller et al. |
| 2013/0145360 A1 | 6/2013 | Ricci |
| 2013/0267271 A1* | 10/2013 | Chueh ............... H04W 52/0258 455/552.1 |
| 2014/0059534 A1 | 2/2014 | Daum et al. |
| 2014/0068596 A1 | 3/2014 | Mota |
| 2014/0109075 A1* | 4/2014 | Hoffman .................. G06F 8/65 717/169 |
| 2014/0136016 A1 | 5/2014 | Pietschmann |
| 2014/0137091 A1 | 5/2014 | Kim |
| 2014/0208306 A1 | 7/2014 | Halder et al. |
| 2014/0215450 A1* | 7/2014 | Salisbury ................. G06F 8/65 717/170 |
| 2014/0223423 A1* | 8/2014 | Alsina ...................... G06F 8/65 717/173 |
| 2014/0245278 A1 | 8/2014 | Zellen |
| 2014/0282467 A1 | 9/2014 | Mueller et al. |
| 2014/0282470 A1 | 9/2014 | Buga et al. |
| 2014/0309864 A1* | 10/2014 | Ricci .................... H04W 48/04 701/36 |
| 2014/0310702 A1 | 10/2014 | Ricci et al. |
| 2014/0325500 A1 | 10/2014 | Jang et al. |
| 2014/0380296 A1 | 12/2014 | Pal et al. |
| 2015/0105687 A1* | 4/2015 | Abreu ...................... A61B 5/01 600/549 |

* cited by examiner

| Communication Network | Priority | Automatic Check for Updates | Automatic Download Updates |
|---|---|---|---|
| Wi-Fi Network | 1 | On  Off | On  Off |
| Propriety Cellular Network | 2 | On  Off | On  Off |
| Bluetooth | 3 | On  Off | On  Off |
| Restore Defaults | | | |

Fig. 6

| Available Network | Status | Automatic Check for Updates | Automatic Download Updates |
|---|---|---|---|
| Office | 📶 | On  Off | On  Off |
| Home | | | |
| Coffee Shop | 📶 | On  Off | On  Off |
| Restaurant | 📶↓ | | |
| Mobile Phone | | On  Off | On  Off |

Allow system to use this network for:
- ☐ Automatic check for software updates (up to 0.5 MB/month)
- ☐ Automatic download software updates (up to 500 MB/month)

Fig. 7

| Available Bluetooth Pairing | Priority | Automatic Check for Updates | Automatic Download Updates |
|---|---|---|---|
| Work Phone | 1 | On  Off | On  Off |
| Personal Phone | 3 | On  Off | On  Off |
| Work Tablet | 2 | On  Off | On  Off |
| Allow Services for ~716 <br> ☐ Phone <br> ☐ Audio Music <br> ☐ Vehicle Link Service | | | |
| Allow system to use this network for: <br> 712— ☐ Automatic check for software updates (up to 0.5 MB/month) <br> 714— ☐ Automatic download software updates (up to 500 MB/month) | | | |

METHODS AND APPARATUS FOR WIRELESSLY UPDATING VEHICLE SYSTEMS

BACKGROUND

The disclosed subject matter relates to methods and apparatus for wirelessly updating vehicle systems, including but not limited to a vehicle operating system, software, application, etc. In particular, the disclosed subject matter relates to configuring processor based vehicle systems to facilitate or otherwise enable software updates, such as with regard to infotainment technology.

Traditional vehicles that travel along predetermined routes (such as on highways, roads, streets, paths, etc.) or along other routes of travel (such as in the air, water, space, etc.) can include instruments and controls that are relevant to affecting aspects of the vehicle's operation (such as speed, route of travel, mileage, fuel supply, etc.) as well as instruments and controls irrelevant to the vehicle's operation (such as audio, video, navigation systems, etc.). These instruments and controls can be implemented via processor based electronic systems, and new types of user interface options have enabled vehicular occupants to access these electronic systems. In fact, some vehicles consolidate some or all electronics, instruments and controls that affect or otherwise relate to vehicle information, navigation, and audio/visual systems into an in-vehicle computer system, such as an infotainment system, which can be accessed or otherwise operated by vehicle occupants via a user interface. The infotainment systems operate in accordance with an operating system, software, applications, etc. that can be installed, loaded, etc. by the manufacturer, dealer, end user, etc.

SUMMARY

The processor based electronics, including the in-vehicle infotainment systems disclosed above, may require one or more updates to the operating system, software, applications, etc. during the life of the vehicle. These updates can be accomplished via a manual process by professionals, such as at a dealership's service facility or other vehicle maintenance installation. In some cases, only professionals are able to perform the updates, which excludes the vehicle owner, operator, etc. from the process due to proprietary software and physical computer interfaces available only at the dealership (or other vehicle maintenance installation) and/or due to lack of training required to perform the update. However, it may be time consuming, expensive, inconvenient, etc. for a vehicle owner, operator, etc. to travel to these locations so that the updates can be performed. In other words, the vehicle owner, operator, etc. needs to deposit the vehicle for service at a dealership for a trained service mechanic to perform the software update, which is disadvantageous to the vehicle owner, operator, etc. for at least the reasons discussed above.

Alternatively, in some circumstances, the vehicle owner, operator, etc. can be provided with the opportunity to perform these updates. However, it may be difficult, time consuming, etc. for the vehicle owner, operator, etc. to manually perform these updates based on a lack of familiarity with the system's updating process, etc. These challenges may also result in the vehicle owner, operator, etc. inaccurately performing the updates. As one example, improperly updating the control ECUs may result in negative consequences, such as the vehicle becoming immobilized.

Thus, it may be beneficial to address at least one of the issues identified above. For example, it may be beneficial to facilitate updates to a vehicle operating system, software, application, etc., such as by reducing or obviating inconvenience to the vehicle owner, operator, etc. It may also be beneficial to reduce difficulty in the update process, such as to improve accuracy, etc., to thereby empower the vehicle owner, operator, etc. to participate in this process.

It may particularly be beneficial to provide a vehicle owner, operator, etc. with the ability to participate in the periodic updating of the operating system, software, applications, firmware, any one or number of vehicle ECUs, etc. of an in-vehicle computer system, such as an infotainment system, via a configurable and automated process for over-the-air (OTA) updates using one or more wireless networks (such as a Wi-Fi network, cellular network, Bluetooth® network, etc.). It may also be beneficial to provide systems and methods that can, after initial configuration by the manufacturer, end user, etc., automatically perform software updates for an in-vehicle infotainment system without further user interaction. For example, an OTA software system update process can include at least two updating processes, i.e., a first updating process that can check for updates (such as from a central server), and a second process that can download the update files, if any updates are identified in the first updating process.

Either or both of these processes can be performed automatically, or alternatively both or either can be performed manually. The vehicle manufacturer, end user, etc. can configure the updating processes disclosed above (i.e., the first and second updating processes) for the in-vehicle infotainment system to check for (automatically or manually) and install (automatically or manually) the updates. In other words, the user, manufacturer, etc. can set the system so that each of these processes can be configured to be performed either automatically or manually. The system can also be configured to have a default setting for each of the first and second updating processes, i.e., either automatic or manual.

The system can be configured for use with any of a plurality of different types of networks, such as cellular service network, Wi-Fi network, Bluetooth® network, etc. Users can also be provided with the ability to configure the system to perform each the first and second updating processes either manually or automatically based on the type of wireless network used, i.e., cellular service network, Wi-Fi network, Bluetooth® network, etc. In other words, one setting (either manual or automatic) can be used for each of the first and second updating processes in the context of a cellular service network, while separate settings can be used in the context of other wireless networks.

In addition, the above and/or other processes and configurations can be implemented via a menu driven user interface, such as to set up the configurations (manual vs. automatic) in all of the contexts disclosed above including for each type of network. However, embodiments are intended to include or otherwise cover any other beneficial type of user interface for implementing the above operations, configurations, etc.

Some embodiments are therefore directed to a processor based control system for enabling users to configure implementation of software updates to a vehicle infotainment system that includes a wireless communication device providing the infotainment system with the ability to receive communications, including the software updates, via one or more wireless networks. The processor based control system can include a processor based controller that is configured to perform a first searching step that includes searching for software updates to the infotainment system, and a second downloading step that includes downloading software updates to the infotainment system that are discovered in the first searching step.

The processor based controller can be configured so that each of the first searching step and the second downloading step can be implemented in either an automatic mode or a manual mode, wherein: in the automatic mode, the processor based controller automatically searches for software updates and/or automatically downloads software updates that are discovered, and in the manual mode, the processor based controller only searches for software updates and/or only downloads software updates that are discovered upon receipt of a manually entered instruction to proceed. The processor based control system can also include a user interface that is configured to enable: each of the first searching step and the second downloading step to be manually set in either the automatic mode or the manual mode, and the processor based controller to be manually instructed to search for software updates and/or download software updates that are discovered if the first searching step and/or the second downloading step are set in the manual mode.

Some other embodiments are directed to a vehicle infotainment system that is configured to enable vehicle occupants to control predetermined operations and/or have access to certain information and being configured for use with one or more wireless networks. The vehicle infotainment system can include a wireless communication interface that is configured to provide the infotainment system with the ability to receive communications, including software updates, via the one or more wireless networks. The vehicle infotainment system can also include a processor based control system for enabling users to configure implementation of the software updates to the vehicle infotainment system. The processor based control system can include a processor based controller that is configured to perform a first searching step that includes searching for software updates to the infotainment system, and a second downloading step that includes downloading software updates to the infotainment system that are discovered in the first searching step.

The processor based controller can be configured so that each of the first searching step and the second downloading step can be implemented in either an automatic mode or a manual mode, wherein: in the automatic mode, the processor based controller automatically searches for software updates and/or automatically downloads software updates that are discovered, and in the manual mode, the processor based controller only searches for software updates and/or only downloads software updates that are discovered upon receipt of a manually entered instruction to proceed. The processor based control system can also include a user interface that is configured to enable: each of the first searching step and the second downloading step to be manually set in either the automatic mode or the manual mode, and the processor based controller to be manually instructed to search for software updates and/or download software updates that are discovered if the first searching step and/or the second downloading step are set in the manual mode.

Still other embodiments are directed to a method of configuring a processor based controller to implement software updates for a vehicle infotainment system that includes a wireless communication device providing the infotainment system with the ability to receive communications, including the software updates, via one or more wireless networks. The processor based controller can be configured to perform a first searching step that includes searching for software updates to the infotainment system, and a second downloading step that includes downloading software updates to the infotainment system that are discovered in the first searching step.

The method can include configuring the processor based controller via a user interface so as to set each of the first searching step and the second downloading step in either an automatic mode or a manual mode, wherein: in the automatic mode, the processor based controller automatically searches for software updates and/or automatically downloads software updates that are discovered, and in the manual mode, the processor based controller only searches for software updates and/or only downloads software updates that are discovered upon receipt of a manually entered instruction to proceed. The method can also include using the user interface to manually instruct the processor based controller to search for software updates and/or download software updates that are discovered if the first searching step and/or the second downloading step are set in the manual mode.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Network Environment for a Vehicle

Some of the disclosed embodiments relate to vehicles configured with technology for a computer system to analyze, display, and/or control information including but not limited to vehicle data and statistics, navigation and traffic data, collision warning data, network communication information, and multi-media management and playout, etc. In the disclosed embodiments, vehicles configured with in-vehicle computer and display technology can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, ATVs, trains, trams, light rail trains, boats, ships, or other watercraft, aircraft, helicopters, or any transport related entity. In fact, the various disclosed methods and apparatus are intended to be usable with any type of mode of transport that can travel along, or can be located in proximity to, any improved, unimproved, and/or unmarked route or path.

Some of the disclosed embodiments relate to automotive infotainment technology and systems, computer-implemented methods, and methods of manufacturing associated therewith. Examples of vehicle computer systems that could implement the embodiments include in-vehicle infotainment systems, audio/video systems, in-car entertainment systems, automotive navigation systems, video game consoles, in-car internet systems, etc. Some of the embodiments are disclosed below in the context of an in-vehicle infotainment system for use with a vehicle communication system that can connect to one or more wireless networks. An in-vehicle infotainment system can refer to any vehicle system that combines vehicle information presentation and entertainment options to drivers and passengers.

Figure 1:
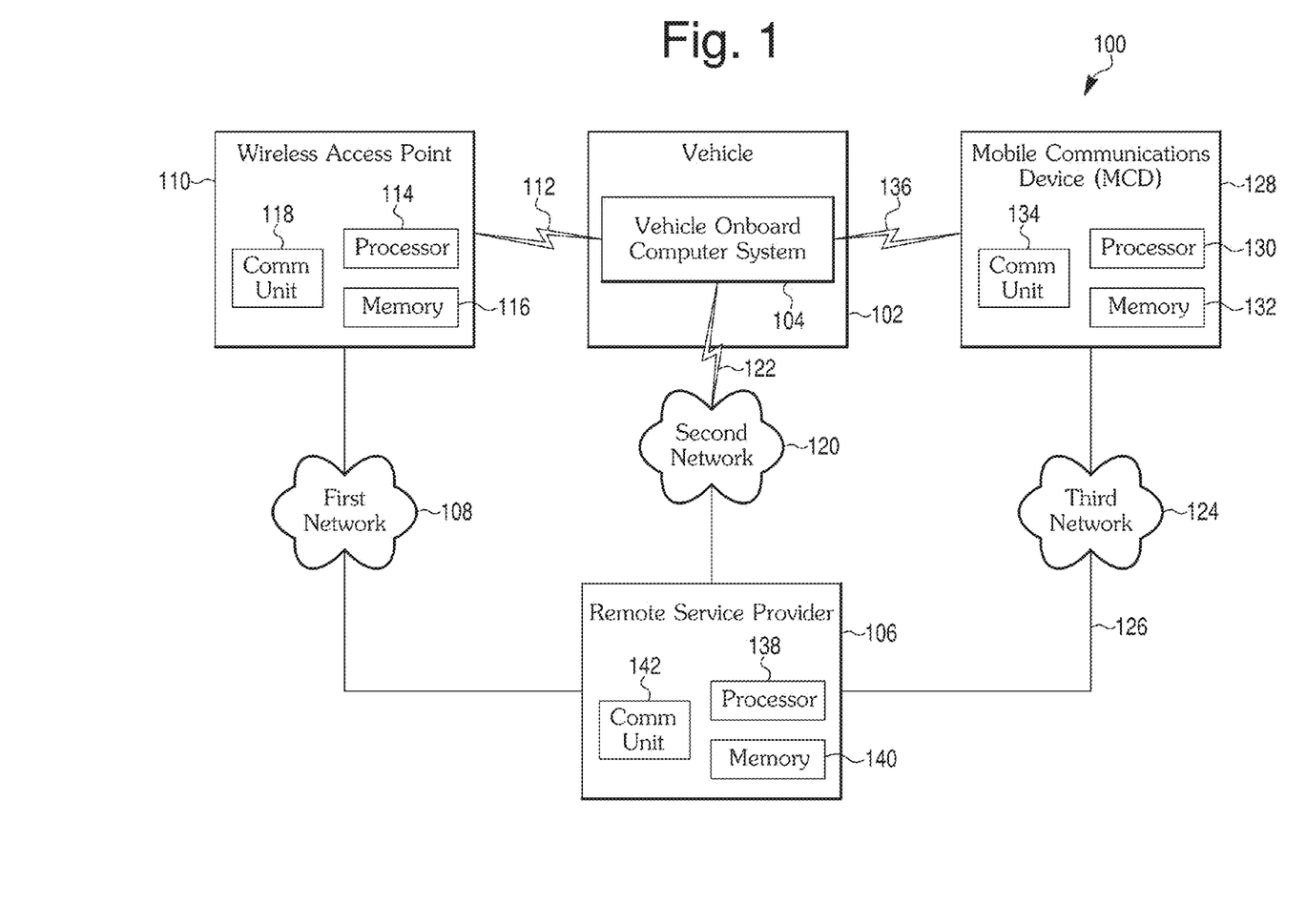
FIG. 1 is a schematic of an environment in which one embodiment may operate.

FIG. 1 is a schematic of an exemplary network environment in which one or more of the embodiments for an in-vehicle vehicle computer system may operate. The disclosed network environment 100 is intended to be implemented with any known, related art or later developed technologies. Additionally, the disclosed network environment 100 may be associated with other information, entertainment, mobile, or computer controlled systems for a vehicle, or used in other applications. Other network environments involving vehicles may include different network protocols and/or arrangements as configured for network environment 100 but may be configured to operate similar to, and be compatible with, network environment 100. A vehicle 102 may have one or more in-vehicle computers configured as an in-vehicle infotainment computer system 104 (computer system). Network environment 100 may provide one or more network connections between computer system 104 and a remote service provider 106. Remote service provider 106 can include a processor 138 and a memory 140 that can store information accessible by processor 138 including instructions and data that may be executed or otherwise used by the processor 138 and update files for computer system 104. Remote service provider 106 may also include a communications unit 142 for communicating with computer system 104. Computer system 104 can link to the remote service provider 106 in order to check for updates to an operating system or applications, download the update files for installation, and download manufacturer or user applications that could be installed in computer system 104.

Computer system 104 can communicate with remote service provider 106 via any one or a plurality of a first network 108, a second network 120, and a third network 124. The first network 108, the second network 120, and the third network 124 are merely exemplary, and the environment 100 is intended to include or otherwise cover cellular telephone networks, satellite networks, a public-switched telephone network (PSTN), a packet-switched network such as the Internet, a local area network (LAN), a wide area network (WAN), a microwave network, and/or other types of networks.

The first network 108 can represent a Wi-Fi network that can be accessed via one or wireless more access points 110. The first network 108 can include devices, processors, and communication connections that utilize 802.x transmission protocols to transmit between endpoints. Although 802.x network protocols are referenced, the first network 108 is intended to include or otherwise cover any Wi-Fi network protocol that can provide wireless connectivity between two endpoints. The first network 108 can include a broadband (Internet) gateway that provides access for end users to the remote service provider 106. Wireless access point 110 can include a processor 114, a memory 116, and other components typically present in general or specialized network devices that can store information accessible by processor 114 including instructions and data that may be executed or otherwise used by the processor 114. The wireless access point 110 may also include a communications unit 118 for communicating with computer system 104.

The network environment 100 may also include the second network 120 that can provide a communication link between the computer system 104 and the remote service provider 106. The second network 120 can include a cellular service network communication link 122 that can include multiple base stations, controllers, and a core network that typically includes multiple switching entities and broadband gateways to the Internet or another broadband network. The computer system 104 can access the second network 120 from any location where a cellular service network signal exists that is a compatible with a communication system 204 (see FIG. 2) for computer system 104.

The network environment 100 may also include a third network 124 that can provide communication between computer system 104 and remote service provider 106, via a short-range communication link 136 between the computer system 104 and a mobile communications device (MCD) 128. MCD 128 can include a processor 130 and a memory 132 that can store information accessible by processor 130 including instructions and data that may be executed or otherwise used by the processor 130. MCD also includes a communications unit 134 that can communicate wirelessly with a short-range wireless network 136 the third network 124. Examples of an MCD 128 include portable consumer devices that are capable of transmission from inside or outside vehicle 104 that include, but are not limited to, a cellular phone, a cellular modem, a personal assistance device, a smart phone, a pocket personal computer, a laptop computer, a tablet computer, a smart watch, or other network-capable consumer devices. In alternate embodiments, an MCD 128 can be a device wirelessly connected or wired to another communication device embedded in the vehicle 102, such as a vehicle embedded phone, a wireless network card, or other device that can complete the functions of MCD 128. The embodiments for third network 124 are intended to include or otherwise cover a short-range network connection 112 between computer system 104 and MCD 128 such as but not limited to Bluetooth®, Wi-Fi, tethered USB connection, or any known or presently unknown short-range network communication protocol. The third network 124 can use the MCD 128 to connect wirelessly over the MCD cellular service communication link 126, which in turn can connect to the Internet or other broadband network to complete a link to remote service provider 106. As such, MCD cellular service communication link 126 can include multiple base stations, controllers, and a core network that typically includes multiple switching entities and gateways to the Internet, for example.

II. In-Vehicle Computer System

Figure 2:
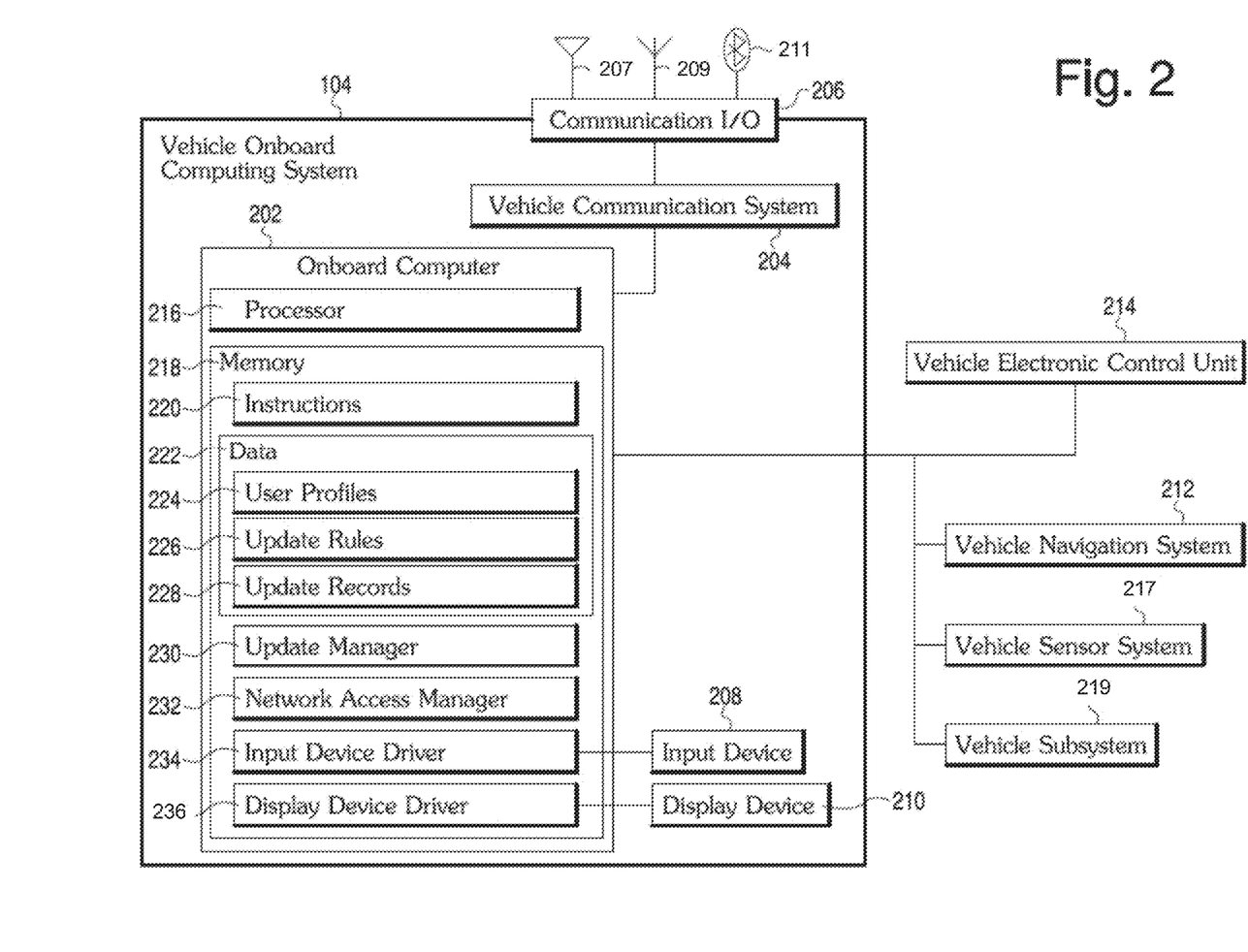
FIG. 2. is a schematic of an in-vehicle vehicle computer system of the embodiments.

A vehicle 102 may have one or more in-vehicle computer systems configured as the in-vehicle vehicle infotainment computer system 104. FIG. 2 is a schematic 200 of devices and systems of the embodiments that include in-vehicle computer 202. The computer system 104 may optionally include a communication system 204 connected to communication input/output 206, input device 208, and display device 210. The communication system 204, communication input/output devices 206, input device 208, and display device 206 may otherwise be separate systems and devices from, but operationally connected to, computer system 104.

In-vehicle computer 202 can include a processor 216, a memory 218 and other components typically present in general or special purpose computers. In some embodiments, the in-vehicle computer 202 may include programmable logic circuits and/or pre-configured logic circuits for executing computer system 104 functions. The memory 218 stores information accessible by the processor 216 including instructions 220 and data 222 that may be executed or otherwise used by the processor 216. The control logic (in this example, software instructions or computer program code), when executed by the processor 216, causes processor 216 to perform the functions of the embodiments as described herein. The memory 218 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the instructions 220 and data 222 are stored on different types of media.

The instructions 220 may be any set of instructions to be executed directly (such as machine code) or indirectly (such as scripts) by the processor 216. For example, the instructions 220 may be stored as computer code on the computer-readable medium. In this regard, the terms "instructions" and "programs" may be used interchangeably herein. The instructions 220 may be stored in object code format for direct processing by the processor 216, or in any other computer language including scripts or collections of independent source code modules that are interpreted on demand or compiled in advance. Functions, methods and routines of the instructions 220 are explained in more detail below.

Data 222 may be retrieved, stored or modified by the processor 216 in accordance with the instructions 220. For instance, although the system is not limited by any particular data structure, the data 222 may be stored in computer registers, in a relational database as a table having a plurality of different fields and records, XML documents, flat files, etc. The data 222 may also be formatted in any computer-readable format. The data 222 may include any information sufficient to identify the relevant information, such as numbers, descriptive text, proprietary codes, references to data stored in other areas of the same memory or different memories (including other network locations) or information that is used by a function to calculate the relevant data.

The processor 216 may be any known, related art or later developed processor. Alternatively, the processor may be a dedicated device, such as an ASIC (application-specific integrated circuit), DSP (digital signal processor), etc. Although FIG. 2 illustrates the processor 216, memory 218, and other elements of computer system 104 as being within the same block, it will be understood by those of ordinary skill in the art that the processor 216 and memory 218 may actually include multiple processors and memories that may or may not be stored within the same physical housing. For example, memory 218 may be a hard drive or other storage media located in a housing that is different from that of computer system 104. Accordingly, references to a processor or computer will be understood to include references to a collection of processors, computers or memories that may or may not operate in parallel. Rather than using a single processor 216 to perform the steps described herein, some of the components, for example input device 208 and vehicle communication system 204 that sends data and information to processor 216 may each have their own processor that performs calculations related to the device's or system's specific function.

In an alternative embodiment, the processor 216 may be located remote from the vehicle 102 and communicate with the vehicle wirelessly through a remote communication system. In the disclosed embodiments, some of the processes described herein can be executed on a processor 216 disposed within the vehicle 102, and others by a remote processor that can be accessed over one of the first 108, second 120, or third 124 wireless networks. Other in-vehicle computer systems associated with some vehicles 102 may include different elements and/or arrangements as configured for computer system 104, but may be configured to operate similar to, and be compatible with, computer system 104.

In-vehicle computer 202 may include all of the components normally used in connection with a computer, such as a central processing unit (CPU) (e.g. processor 216), the memory 218 (e.g., RAM and internal hard drives) storing data 222 and instructions 220, a communicator/annunciator such as a display device 210 (e.g., a monitor having a screen, a small LCD touch-screen or any other electrical device that is operable to display and/or audibly playout information) configured by display device driver 240, and a user input device 208 (e.g., a mouse, keyboard, touch screen, camera, scanner, and/or microphone) configured by an input device driver 234. It will be understood that, although various systems and computer system 104 are shown within vehicle 102, these elements may be external to vehicle 102 and/or physically separated by large distances.

Data 222 can include but is not limited to data for user profiles 224, computer system update rules 226, and computer system update records 228. The computer system 104 can also include components not normally associated with general purpose computers, such as a computer system update manager 230 that tracks and controls versions and updates for software, and a network access manager 232 that controls and saves configurations for vehicle communication system 204 to communicate with remote service provider 106.

The computer system 104 may be capable of communicating with various components of the vehicle 102. For example, computer system 104 may be in operational communication with a vehicle electronic control unit (ECU) 214, which controls vehicle processes and systems relevant to operation of the vehicle 102. ECU can receive data from vehicle systems including sensor system 217 and vehicle subsystem 219 and transmit the data to in-vehicle computer 202. Data from vehicle subsystem 219 and sensor system 217 includes, but is not limited to, fuel level, speed, a rotational speed of an engine, engine temperature, battery charge level, camera images, radar sensor data, etc. Vehicle navigation images and data may be received by computer system 104 from a vehicle navigation system 212 via a direct link or through ECU 214. Vehicle navigation system 212 may include a separate navigation system computer and display or alternatively may share in-vehicle computer 202 and display device 210 with computer system 104.

As indicated above, the computer system 104 may also include the vehicle communication system 204. Vehicle communication system 204 may include a communication input/output (I/O) 206 that can be used to control radio transmissions between vehicle communication system 204 and external receivers using cellular communication transceiver 207, Wi-Fi communication transceiver 218, and short-range communication transceiver 211 (e.g., a Bluetooth® transceiver). While the communication I/O, vehicle communication system 204, input device 208, and display device 210 are shown as part of in-vehicle computer system 104 in FIG. 2, it is understood these devices may separate from computer system 104.

III. Vehicle Interior

Figure 3:
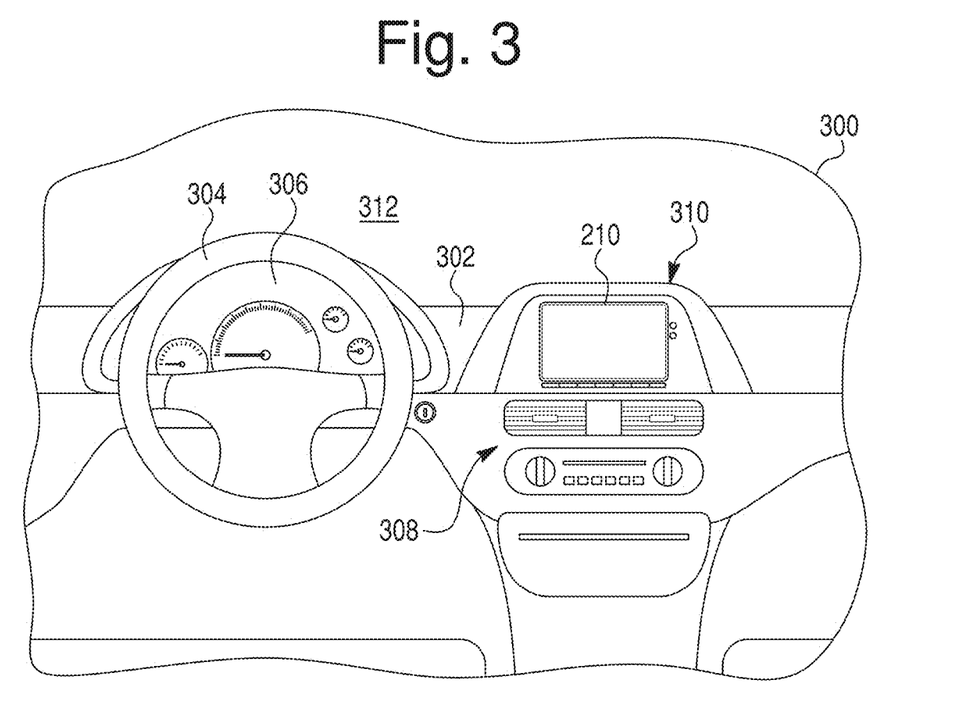
FIG. 3 is a schematic of an exemplary design of a vehicle interior including a display device with which an embodiment may operate.

FIG. 3 is a schematic of an exemplary design of a vehicle interior 300 associated with the vehicle 102 and computer system 104 of FIGS. 1 and 2. The vehicle interior 300 may include, for example, a dashboard 302, a steering apparatus such as a steering wheel 304, an instrument panel 306, and a center portion 308. Center portion 308 can include one or more input devices 208 associated with the computer system 104, including but not limited to audio devices, video devices, portable consumer device docking stations or USB ports, as well as any other types of input devices. In addition, center portion 308 can be associated with controls for one or more systems of vehicle 102 including, but not limited to: climate control systems, radio and sound systems, and other types of systems. The vehicle interior 300 may also include the display device 210 (see FIG. 2) for displaying information from in-vehicle infotainment computer system 104, and/or other related or unrelated vehicular systems such as vehicle navigation system 212. Examples of display device 210 include, but are not limited to, LCDs, CRTs, ELDs, LEDs, OLEDs, or electronic paper displays. A touchscreen-capable display device 210 may also function as input device 208 for activating or deactivating one or more applications of computer system 104 and selecting software update configurations of the embodiments. Input device 208 can include buttons, a keypad, or other types of user input technology on and around center dashboard 310. In another embodiment, display device 210 can include a heads-up projection type display that is configured to project an image onto one or more surfaces of vehicle interior 300, such as windshield 312. In some embodiments, display device 210 can be located in any portion of vehicle interior 300, or can be a portable electronic device that can wirelessly connect to computer system 104 via, for example, third network 124. Additionally, display device 210 can be installed in other areas of interior 300 such as instrument panel 306 or anterior to a passenger seat headrest (not shown).

In addition, while display device 210 can be configured to present visual information for computer system 104, display device 210 can be shared with other devices or systems within vehicle 102 such as vehicle navigation system 212, vehicle communication system 204, etc. or a compatible computer system in another vehicle.

IV. Methods of Operation

Figure 4:
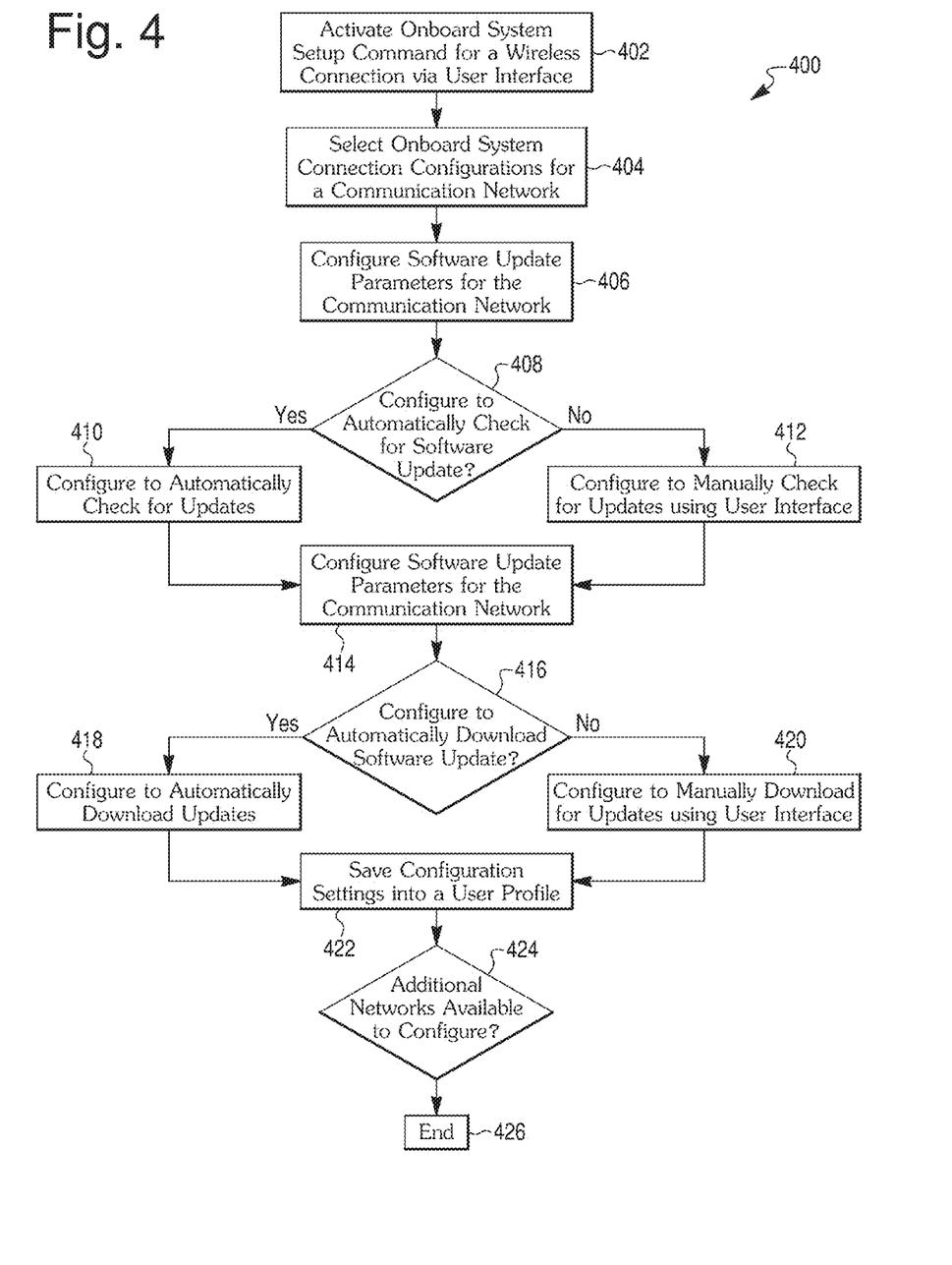
FIG. 4 is a flowchart of an exemplary process for an over-the-air software update configuration for the in-vehicle vehicle computer system of FIG. 2.

The flowchart in FIG. 4 discloses an exemplary process for configuring in-vehicle computer 202 for an over-the air (OTA) software update of the computer system 104. The exemplary process 400 can be implemented partially or entirely using the embodiments for devices and systems of the figures. However, the devices, systems, user interfaces and processes of the embodiments may be applied to other embodiments for network environments, in-vehicle computers, in-vehicle infotainment systems, vehicle control systems, etc.

The process 400 may include a step 402 to activate a computer system 104 setup command for a wireless network connection via a user interface. The embodiments permit a selection and use of one, two, or more than two wireless networks by computer system 104 to check for software file updates and, if the computer system 104 determines that software updates are available, download the update files to memory 218. An end user or any other relevant entity can determine preferences as one or more criteria that set rules and parameters for accessing the one or more networks for one or more of the update processes. The update manager 230 can also apply certain criteria to the one or more networks that may be available for use by computer system 104, and, based the one or more criteria, choose which of the available networks to utilize for performing software update processes. The update manager 230 can collect and analyze data for each network in environment 100, and based on the user preferred criteria and network data, determine a statistical likelihood of success for completing a file update download in a current location or trajectory of the vehicle 102.

In the embodiments, the update manager 230 may use one or more equations that are derived from a statistical method, such as Bayes' Theorem or Bayesian Rule, to perform calculations and generate predictions for which network to use according to one or more criteria. Generally, Bayes' Theorem relates the conditional and marginal probabilities of various random events. Using a Bayesian Rule, probabilities of different events occurring may be determined given certain observed scenarios. As a result, the probability of an event occurring generally increases as more prior information from observed scenarios is provided. The update manager 230 may use a Bayesian Rule to combine the various probabilities determined based on conditions, connection status, download speeds, vehicle location, and other criteria associated with any of the update rules 226, network data, and vehicle data.

While some of the embodiments are based on an application of Bayes' Theorem, other embodiments are intended to include or otherwise cover other calculation methods by the update manager 230. The update manager 230 may utilize empirical assumptions, fuzzy logic, neural network applications, analysis of variance (ANOVA), discriminant analysis, or any other appropriate analytical and/or statistical methods to perform data analysis and make predictions.

In the embodiments, criteria to determine use of a network in environment 100 can include a location of the vehicle 102 within a network coverage area and the likelihood of the vehicle 102 remaining within the network coverage area for enough time to download an update file based on network download speeds at the vehicle's current and predicted location. Update manager 230 can track a driver's behavior to determine patterns of the vehicle 102 remaining within range of network coverage for one or more networks at certain locations and certain times of day. The update manager 230 can predict whether downloading an update file while the vehicle is traveling in a certain area at a certain average speed would likely provide adequate time to download the update file from remote service provider 106.

Another example of network criteria includes a time of day to check for and download an update file. If a software update file is not a critical update, the update manager 230 can predict, based on preferences in the update rules 226, network type and data speeds, and a time of day, or other criteria, that a specific network accessed at a certain time of day will have a highest likelihood of success to complete a file download. For instance, an end user may enter preferences into update manager 230 to only use Wi-Fi networks to download files over a certain size. However, download manager 230 may automatically predict a mostly likely network, and therefore vehicle location, for downloading the files, based on analysis of the user preferences and criteria including network performance data collected over time. The update manager 230 may statistically determine that, to download files over a certain size, a home Wi-Fi network should be used when the vehicle 102 is parked within range of the home network and the time of day is between midnight and 6:00 a.m. The update manager 230 may also predict that an office Wi-Fi network is also likely to successfully download update files over a certain size at any time of day when the vehicle is parked within range of an office Wi-Fi network. Other criteria, that can be determined automatically by the update manager 230 or manually from end user preferences, can be used to determine one or more networks to use to perform update processes of the embodiments.

Figure 5:
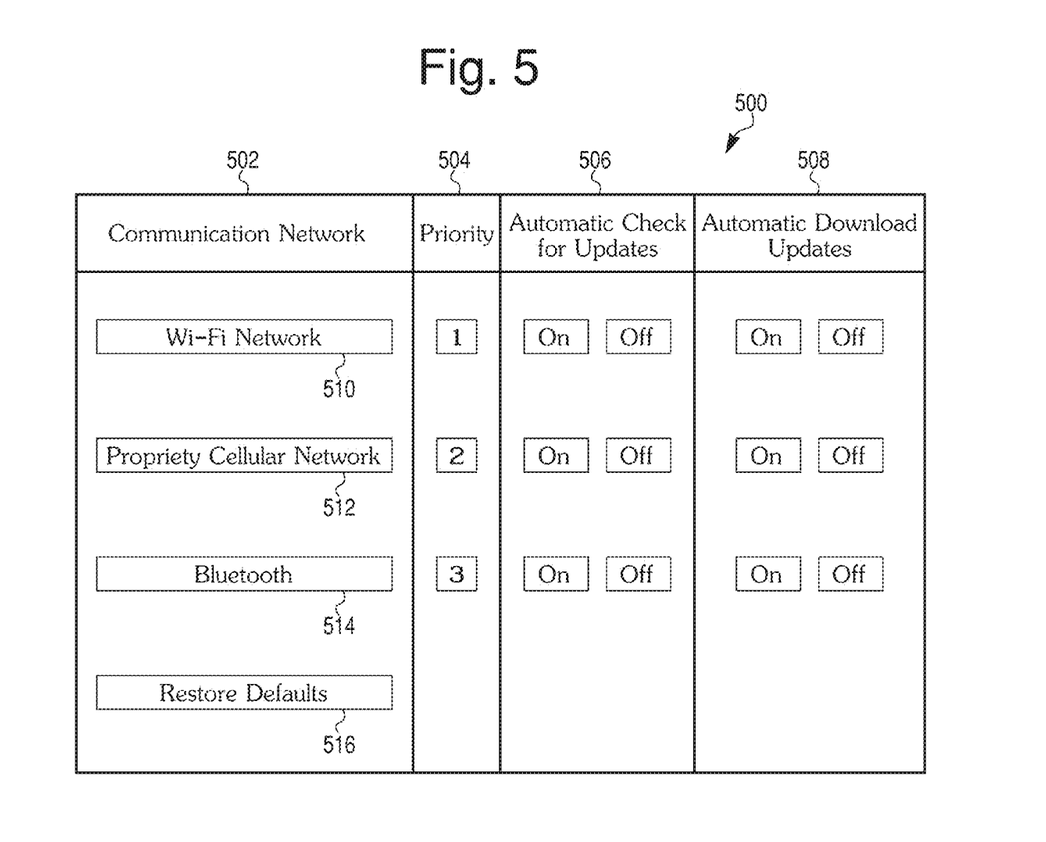
FIG. 5 is a schematic of an embodiment of a network management interface for the update configuration process of FIG. 4.

FIG. 5 shows an exemplary user interface 500 that can be executed by in-vehicle computer 202 and displayed on display device 210. The update manager 230 can configure and save update rules 226 for each network in network environment 100 from the instructions 220 received from end user inputs through user interface 500.

User interface 500 can include or otherwise cover a graphical user interface, a menu driven interface, a voice command interface, a motion-sensitive interactive interface, or any type of interface that can configure network access settings for software updates. User interface 500 includes selectable menus for communication networks 502, network priority 504, automatic check for updates 506, and automatic download of updates 508. The user interface 500 can display, in communication network menu 502, each type of communication network either configured or available for use with the update processes of the embodiments that is accessible by computer system 104 in network environment 100. For instance, the menu selection for Wi-Fi network 510 can correspond to selecting the first network 108, the menu selection for proprietary cellular network 512 can correspond to selecting the second network 120, and the menu selection for Bluetooth® 514 can correspond to selecting the third network 124.

The user interface 500 can also allow the manufacturer or an end user to configure a use of each network in menu 502 and a general priority of each network in priority menu 504. If two or more networks in menu 502 are set to the same update configuration, the priority menu 504 will instruct computer system 104 as to which network with the highest priority to attempt to use for updates, and if that network fails to connect or becomes unavailable, to switch to a network of a lower priority until a software update process is complete.

Each network in communication network menu 502 can be configured for automatic check for updates selections in menu 506 and automatic download of update files in menu 508. In the embodiment, each network can have at least two settings in each of the update configuration menus 506 and 508, either "ON" or "OFF." An "ON" selection for a network will permit update manager 230 of computer system 104 to automatically check for updates and/or automatically download an update file from remote service provider 106. An "OFF" selection for a network will deny the update manager 230 the permission to check for updates and/or automatically download an update file from remote service provider 106. An end user may configure the first (Wi-Fi 510) network 108 to "OFF" in menu 506 for automatic check of updates but configure the first (Wi-Fi 510) network 108 to "ON" in menu 508 for automatic download of updates. The same end user may configure the second (proprietary cellular 512) network 120 to "ON" in menu 506 for automatic check for updates and to "OFF" in menu 508 for automatic download of updates. The end user may also configure the third (Bluetooth® 514) network 124 similarly to the second network, i.e., to "ON" in menu 506 for automatic check for updates and to "OFF" in menu 508 for automatic download of updates. The variation in network configurations can be selected by an end user for any reason desired. For example a Wi-Fi signal may provide faster download speeds over first network 108, which would allow quick automatic download of update files. An automatic check for updates in menu 506 requires much lower bandwidth and file transfer size and therefore could be performed over a slower speed and smaller bandwidth second network 120 or third network 124. However, a cellular service network has far greater coverage area than a Wi-Fi network including lower signal attenuation and therefore could be a more advantageous selection for downloading an update file while vehicle 102 is moving. Alternative configuration settings can be offered to an end user on a user interface that further restricts how the update manager 230 selects the networks to update software.

To begin configuration of update settings with user interface 500, in step 404 the process 400 can permit an end user to select an in-vehicle system connection configuration for a communication network in communication network menu 508. In the example of FIG. 5, the communication network menu 508 can permit selection of one of the Wi-Fi network 510, proprietary cellular service network 512 or Bluetooth® network 514. After one of the networks is selected for configuration, in step 406 the process can configure, using the update manager 230 following update rules 226, the software update parameters for the communication network selected in step 404. An initial configuration can include permitting, in priority menu 504, a selection for priority of networks the computer system 104 should use for checking for updates and performing a download of update files. In the user interface shown in FIG. 5, the Wi-Fi selection 510 was selected as a first priority, the proprietary cellular service network 512 as a second priority, and the Bluetooth® network 514 as a third priority. If any two or more networks in menu 508 have the same settings, the priority menu 504 determines which network the update manager 230 will use first to check for and download software updates until the network is unavailable, at which time the update manager will switch to the next lower priority network until a network is available.

In FIG. 4, the process 400 may also include step 408 to configure networks to automatically check for software updates according to one or more criteria. An end user may, in step 410, configure the menu 506 for any of the communication networks in menu 502 to automatically check for a software update. As described above, an end user may select one, two, or all three of the networks in menu 508 to perform automatic check for updates by selecting ON for each network in menu 506. For example, an end user desiring to use only first (e.g., Wi-Fi) network 108 may turn ON automatic check for updates using menu 506 for Wi-Fi 510 and turn automatic check for updates 506 OFF for proprietary cellular service network 512 and Bluetooth® 514. Alternatively, due to the limited range of a hotspot in a Wi-Fi network, an end user may desire to use a prioritized check for automatic updates, thereby selecting ON for all networks in menu 506 thereby invoking priority menu 504 as the automatic rollover process to find an available network when one network type is out of range or otherwise unavailable.

An end user may select OFF for each menu 506 for automatic check for updates corresponding to Wi-Fi 510, proprietary cellular service network 512, and Bluetooth® 514. If an end user does not configure any network in menu 502 to automatically check for updates in step 410, then the process 400 can include step 412 where the user interface menu 506 configures update manager 230 to permit a manual check for software updates. A manual check for updates can be performed by executing an application to check for updates based on instigation of the update check by an end user.

After selection of either ON or OFF in menu 506 for each communication network, the computer system 104 is configured, in step 414, to check for software updates at a first menu level. Selections for menu 506 can be saved to update records 226 by update manager 230. Additional menus for network update configurations are described in relation to the user interfaces illustrated in FIGS. 6 and 7 below.

The process 400 can also include step 416 to configure automatic download of software updates in user menu 508. An end user may, in step 418, configure one or more networks in menu 502 to automatically download a software update when an update has been identified in steps 410 or 412.

An end user desiring to automatically download updates may use menu 508 to select ON for one, two, or all of the networks listed in menu 502 to perform automatic download of software update files via the respective network. For example, an end user desiring to use only first (e.g., Wi-Fi) network 108 may turn ON automatic download of updates using menu 508 for Wi-Fi 510 and turn automatic download of updates 508 OFF for proprietary cellular service network 512 and Bluetooth® 514. Alternatively, due to the limited range of a hotspot in a Wi-Fi network, an end user may desire to use a prioritized automatic download of software updates, thereby selecting ON for all networks in menu 508, thereby invoking priority menu 504 settings as the automatic rollover process to find an available network when one network type is out of range or otherwise unavailable.

If an end user determines not to configure any network in menu 502 to automatically download software updates in step 416, then the process 400 can include step 420 where the end user may select OFF for selectable menu 508 relating to each communication network in menu 502. The update manager is then configured permit only manual downloads of software updates.

After configuring automatic download updates in menu 508, in step 422 the update manger 230 can save the configuration settings for all preferences in user interface 500 to a user profile in user profile data 224.

In an embodiment, the process 400 may include step 424 to determine if additional networks are available to configure. If one or more networks in menu 502 were not configured during a session, then the update manager 230 may query, through user interface 500, as to whether the end user desires to configure a network that was not adjusted during the current session. If no further network configurations are desired by an end user, the process can end in step 426. Additional network configurations that can be saved as preferences in user profile data 224 are described more fully in relation to FIGS. 6 and 7 below.

A vehicle manufacturer can configure default settings for all selectable menus in user interface 500. An end user may change default selections, as described above, according to the end user's preferences. After these changes have been made, all selectable menus can be restored to original defaults by end user selecting restore defaults menu item 516.

Figure 6:
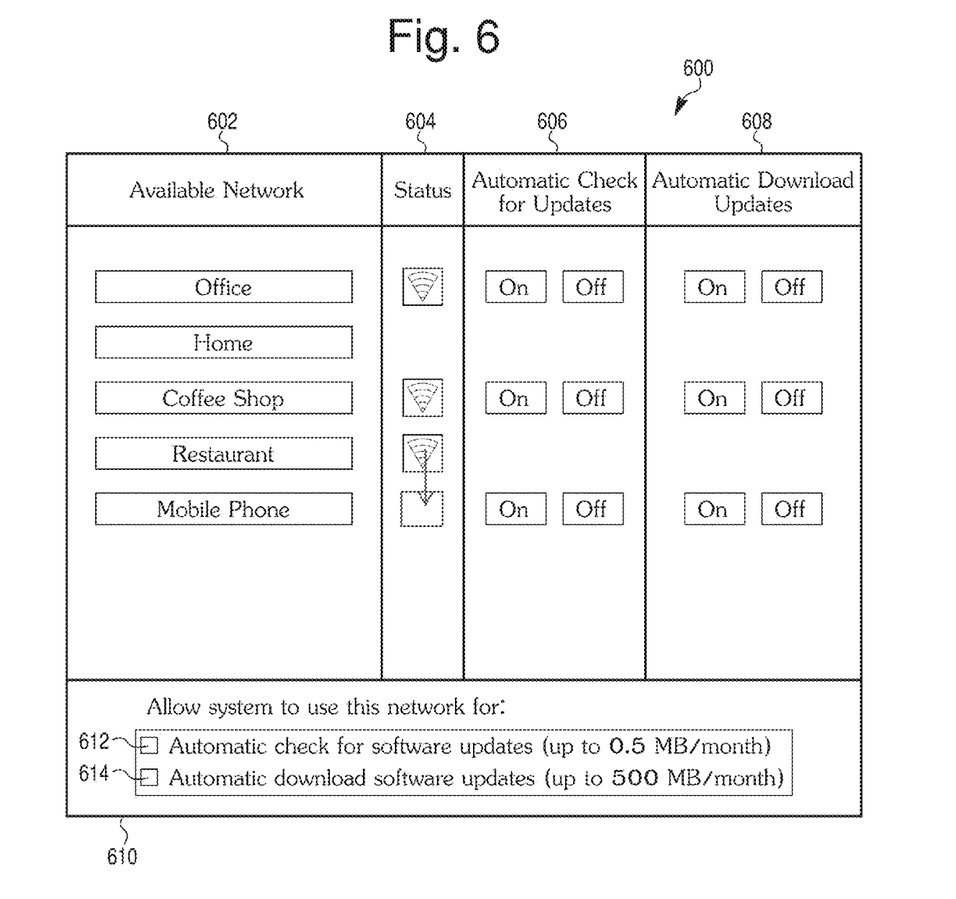
FIG. 6 is a schematic of an embodiment a network configuration interface for the configuration process of FIG. 4.

As part of the configuration process 400 of FIG. 4, the selection of one of the networks in menu 508 can access sub-menus that permit further configuration of a communication network. For example, selecting Wi-Fi network 510 can access user interface 600 as an embodiment for additional configuration of one or more Wi-Fi networks. The use of the one or more Wi-Fi networks can be based on one or more end user criteria and/or one or more criteria determined by update manager 230. User interface 600 can include an available Wi-Fi network menu 602, a network status menu 604, an automatic check for updates menu 606, and an automatic download updates menu 608. In the example, "Office", "Coffee shop", and "Restaurant" are the names of each 802.x network that can be detected by communication input/output devices 206 within the vicinity of vehicle 102. The networks "Home" and "Mobile Phone" are Wi-Fi networks that have been previously detected and saved for automatic connection into menu 602. A vehicle manufacturer or the end user may also preselect certain Wi-Fi networks for automatic connection, i.e., all Wi-Fi hotspots for a chain of coffee shops. One or more networks 602 may be preauthorized for automatic connection by saving a network name and password into user profiles 224.

The user interface 600 can also permit the vehicle manufacturer or the end user to select from user interface menu 606 for automatic check for updates and from user interface menu 608 for automatic download of update files for each network named or shown in menu 602. An ON selection in menu 606 for a particular network in menu 602 will permit update manager 230 to automatically check for software updates from remote service provider 106 when a particular Wi-Fi network listed in menu 602 is available. An ON selection in menu 608 will permit update manger 230 to automatically download update files from the remote service provider 106 when a particular Wi-Fi network listed in menu 602 is available and the automatic check for updates determines that a software update file is available to download.

Each Wi-Fi network listed in menu 602 may be further configured by adding one or more criteria of restrictions of use such as those listed in menu 610. Selection of restriction menu 612 can permit the computer system 104 to use a specific Wi-Fi network in menu 602 for automatic check of software updates until a predetermined cumulative bandwidth usage is reached, such as 0.5 MB/month. Selection of restriction menu 614 can permit the computer system 104 to use a specific Wi-Fi network in menu 602 for automatic download of software updates until a predetermined cumulative bandwidth usage is reached, such as 500 MB/month.

Figure 7:
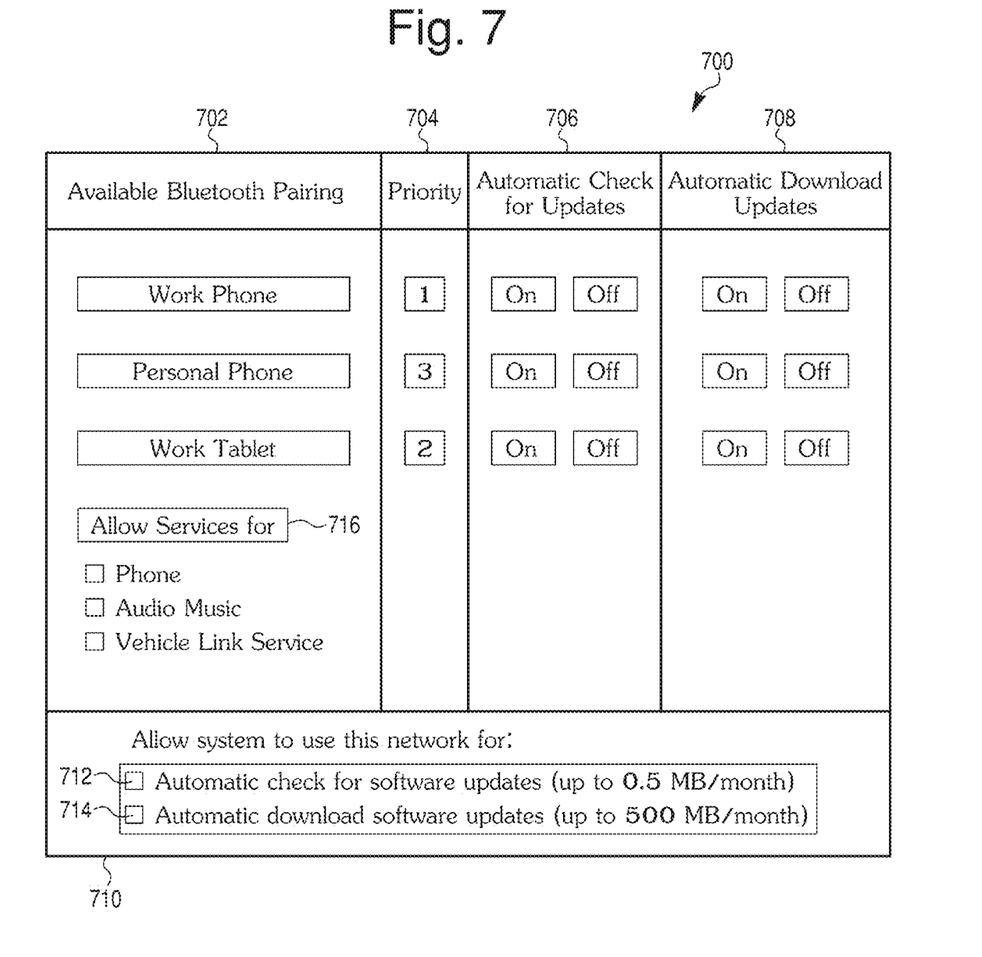
FIG. 7 is a schematic of an additional embodiment for a network configuration interface for the configuration process of FIG. 4.

FIG. 7 is a schematic of a user interface 700 showing an additional embodiment for further configuration of the Bluetooth® communication network selection 514 in FIG. 5. User interface 700 includes one or more Bluetooth® connections that are available for pairing in menu 702, a network priority menu 704, an automatic check for updates menu 706, and an automatic download updates menu 708. The use of the one or more Bluetooth® connections can be based on one or more end user criteria and/or one or more criteria determined by update manager 230. Menu 702 lists the available Bluetooth® pairing connections to an MCD 128 over the short-range communication network 124 such as "Work Phone", "Personal Phone", and "Work Tablet." One or more Bluetooth® pairings 702 may be preauthorized for automatic connection by network access manager 232 using information from user profile 224. The end user may select any of the available Bluetooth® networks in menu 702 for further configuration. If more than one Bluetooth® connections are available, the paired connections may be prioritized using priority menu 704. For example, an end user may desire to prioritize a work phone and work tablet ahead of a personal phone as an MCD to pair with the Bluetooth® network 128.

The user interface 700 can also permit the end user to select from user interface menu 706 for automatic check for updates and from user interface menu 708 for automatic download of update files for each Bluetooth® network named or shown in menu 702. An ON selection in menu 706 will cause computer system 104 to check for software updates from remote service provider 106 via third network 124. An ON selection in menu 708 will permit computer system 104 to automatically download update files from the remote service provider 106 when the selected Bluetooth® connection and third network 124 are available.

For convenience of the end user, the user interface 700 may include a selectable menu item 716 to permit certain services for each Bluetooth® network configured that include, but are not limited to, mobile phone, audio music, and vehicle link service (e.g., private network of a manufacturer).

Each Bluetooth® network listed in menu 702 may be further configured by adding one or more criteria of restrictions of use such as those listed in menu 710. Selection of restriction option 712 can permit the computer system 104 to use a specific Bluetooth® network in menu 7 for automatic check of software updates until a predetermined cumulative bandwidth usage is reached, such as 0.5 MB/month. Selection of restriction option 714 can permit the computer system 104 to use a specific Bluetooth® network in menu 702 for automatic download of software updates until a predetermined cumulative bandwidth usage is reached, such as 500 MB/month.

The above described techniques may take the form of computer or controller implemented processes and apparatuses for practicing those methods. The disclosure can also be embodied in the form of computer program code containing instructions 220 embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

V. Alternative Embodiments

While certain embodiments of the invention are described above, and FIGS. 1-7 disclose the best mode for practicing the various inventive aspects, it should be understood that the invention can be embodied and configured in many different ways without departing from the spirit and scope of the invention.

Exemplary embodiments are intended to include or otherwise cover additional criteria to configure and use one or more networks listed in communication network menu 502. Additional criteria may include tracking a vehicle's movement as it passes through different network coverage areas and tracking the strength and type of network signals received along various paths of the vehicle 102. Network data collected along a path of the vehicle 102 can include network protocols for a type of network, sub-network protocols within the network, e.g., 4G network, 3G network, GSM network, Wi-Fi networks, and bandwidth or download speeds of each network and sub-network along the path of the vehicle. Update manager 230 can track the vehicle's path through the various networks over time, and use the data to build criteria to predict a likelihood of success of downloading an update file on a certain network along a certain path based on strength of the signal, time of the vehicle 102 within network coverage area, and download speed of the network links detected along the path.

Exemplary embodiments are intended to include or otherwise cover any type wireless network for use by a vehicle's infotainment system to check and download software update files to computer system 104 according to one or more user defined or automatically determined criteria. In other words, exemplary embodiments are intended to cover any application of a process of determining a wireless network out of two or more networks that is the most likely network to successfully complete a download of an operating system or application file to in-vehicle computer 202 under predetermined criteria.

Some of the exemplary embodiments are disclosed in the context of in-vehicle vehicle computer systems for infotainment systems. However, any and all of the disclosed features can also be applied to other types of in-vehicle vehicle computer systems, such as manually operated vehicles. In fact, some embodiments can be applied in contexts that do not involve vehicles.

Exemplary embodiments are intended to include or otherwise cover any type of a software-driven entertainment or information system for vehicle 102 according to the embodiments that can be configured outside of the vehicle 102 and that can communicate instructions 220 and commands for execution of system operations. An example of an infotainment system that can be configured outside of the vehicle 102 is an infotainment system that is manufactured, tested, and configured as an individual unit, and the unit later installed within vehicle 102.

In other words, the various embodiments are not limited to vehicle infotainment systems, and can alternatively or additionally be applied to other vehicle systems that include software and/or firmware. For example, the various embodiments can be applied to over the air firmware updates as well as software updates, and vehicle systems other than infotainment systems (such as vehicle ECUs) can be updated.

Exemplary embodiments are intended to cover execution of method steps on any appropriate specialized or general purpose server, computer device, or processor in any order relative to one another. Some of the steps in the embodiments can be omitted, as desired, and executed in any order.

A computer architecture of the embodiments may be a general purpose computer and/or processor or a special purpose computer and/or processor. A computer and/or processor can be used to implement any components of the computer system 104 or the computer-implemented methods of the embodiments. For example, components of computer system 104 can be implemented on a computer via its hardware, software program, firmware, or a combination thereof. Although individual computers or servers are shown in the embodiments, the computer functions relating to computer system 104 may be implemented in a distributed fashion on a number of similar platforms, to distribute the processing and/or functional load.

Embodiments are also intended to include or otherwise cover methods of using and methods of manufacturing the computer system 104 disclosed above. The methods of manufacturing include or otherwise cover processors and computer programs implemented by processors used to design various elements of the computer system 104 above. For example, embodiments are intended to cover processors and computer programs used to design or test the computer system 104.

Exemplary embodiments are intended to cover all software or computer programs capable of enabling processors to execute instructions 220 and implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a network, such as downloading update files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi networks, a Dedicated Short Range Communications (DSRC), network, short-wave radio, television, cable, satellite communications, and/or any other delivery or tunneling mechanism for carrying data. A network may include multiple networks or sub-networks, each of which may include, for example, a wired or wireless data pathway. The network may include a circuit-switched network, a packet-switched network, or any other network able to carry electronic communications. For example, the network may include networks based on the Internet protocol (IP) or asynchronous transfer mode (ATM). Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. A processor based control system for enabling users to configure implementation of software updates to a vehicle system, the process based control system comprising:
   a processor;
   a user interface coupled to the processor;
   a wireless communication device providing the vehicle system with the ability to receive communications, including the software updates, via one or more of a plurality of wireless networks; and
   a memory, coupled to the processor, storing instructions that when executed by the processor cause the processor based control system to execute the following operations:
   searching for software updates to the vehicle system in a first searching step, and downloading software updates to the vehicle system in a second downloading step that are discovered in the first searching step, wherein each of the first searching step and the second downloading step can be implemented in either an automatic mode or a manual mode, wherein:
      in the automatic mode, automatically searching for software updates in the first searching step and automatically downloading software updates in the second downloading step that are discovered in the first searching step, and
      in the manual mode, searching for software updates in the first searching step and downloading software updates in the second downloading step that are discovered in the first searching step only upon receiving a manually entered instruction to proceed;
   receiving user settings from the user interface and storing the user settings in the memory, the user settings including a separate and independent setting for each of the plurality of wireless networks in either the automatic mode or the manual mode for each of the first searching step and the second downloading step prompting a user to manually search for software updates and/or download software updates if the first searching step and/or second downloading step are set in the manual mode, and storing in the memory a priority inputted by the user for each of the plurality of wireless networks, and automatically selecting a wireless network having a highest priority to search for software updates and/or download software updates that are discovered if the first searching step and/or the second downloading step are set in the automatic mode for the wireless network having the highest priority, determining whether the first searching step is set to one of the automatic mode and the manual mode and the second downloading step is set to a different one of the automatic mode and the manual mode, and if so, performing the first searching step on one of the plurality of wireless networks and performing the second downloading step on a different one of the plurality of wireless networks.

2. The processor based control system of claim 1, wherein the user settings are a manual setting for each of the plurality of wireless networks that is continuously applied until manually reset in the user interface.

3. The processor based control system of claim 1, wherein the operations further comprise:

saving a default mode for each of the first searching step and the second downloading step that is retrieved when the processor based control system is initialized, such that each of the first searching step and the second downloading step revert to the default mode each time the processor based control system is booted up.

4. The processor based control system of claim 3, wherein the default mode for both the first searching step and the second downloading step is the automatic mode.

5. The processor based control system of claim 3, wherein the default mode for both the first searching step and the second downloading step is the manual mode.

6. The processor based control system of claim 3, wherein the default mode for the first searching step is one of the automatic mode and the manual mode, and the default mode for the second downloading step is a different one of the automatic mode and the manual mode.

7. The processor based control system of claim 1, wherein the wireless communication device provides the system with the ability to receive communications, including software updates, via a Wi-Fi network, a cellular service network, and a short-range communication network.

8. The processor based control system of claim 7, wherein automatically selecting the wireless network having the highest priority is based on network communications criteria that includes a limit for cumulative wireless network data reception over a time period, and selecting the wireless network having the highest priority is based on at least one of time of day, vehicle location, and signal strength.

9. The processor based control system of claim 7, wherein the user interface is menu driven to provide separate menus for each of the plurality of wireless networks, such that the user settings for each of the wireless networks in either the automatic mode or the manual mode for each of the first searching step and the second downloading step are manually set via separate windows for each of the plurality of wireless networks.

10. A vehicle system to enable vehicle occupants to control predetermined operations and/or have access to certain information using a plurality of wireless networks, the vehicle system comprising:

a wireless communication interface providing the vehicle system with the ability to receive communications, including software updates, via one or more of the plurality of wireless networks; and a processor based control system for enabling users to configure implementation of the software updates to the vehicle system, the processor based control system comprising:

a processor;

a user interface coupled to processor; and a memory, coupled to the processor, storing instructions that when executed by the processor causes the processor based control system to execute the following operations:

searching for software updates to the vehicle system in a first searching step, and downloading software updates to the vehicle system in a second downloading step that are discovered in the first searching step, wherein each of the first searching step and the second downloading step can be implemented in either an automatic mode or a manual mode, wherein:

in the automatic mode, automatically searching for software updates in the first searching step and automatically downloading software updates in the second downloading step that are discovered in the first searching step, and in the manual mode, searching for software updates in the first searching step and downloading software updates in the second downloading step that are discovered in the first searching step only upon receiving a manually entered instruction to proceed;

receiving user settings from the user interface and storing the user settings in the memory, the user settings including a separate and independent setting for each of the plurality of wireless networks in either the automatic mode or the manual mode for each of the first searching step and the second downloading step;

prompting a user to manually search for software updates and/or download software updates if the first searching step and/or second downloading step are set in the manual mode;

storing in the memory a priority inputted by the user for each of the plurality of wireless networks, and automatically selecting a wireless network having a highest priority to search for software updates and/or download software updates that are discovered if the first searching step and/or the second downloading step are set in the automatic mode for the wireless network having the highest priority; and determining whether the first searching step is set to one of the automatic mode and the manual mode and the second downloading step is set to a different one of the automatic mode and the manual mode, and if so, performing the first searching step on one of the plurality of wireless networks and performing the second downloading step on a different one of the plurality of wireless networks.

11. The vehicle system of claim 10, wherein the user settings are a manual setting for each of the plurality of wireless networks that is continuously applied until manually reset in the user interface.

12. The vehicle system of claim 10, wherein the operations further comprising:
saving a default mode for each of the first searching step and the second downloading step that is retrieved when the processor based control system is initialized, such that each of the first searching step and the second downloading step revert to the default mode each time the processor based control system is booted up.

13. The vehicle system of claim 12, wherein the default mode for both the first searching step and the second downloading step is the automatic mode.

14. The vehicle system of claim 12, wherein the default mode for both the first searching step and the second downloading step is the manual mode.

15. The vehicle system of claim 12, wherein the default mode for the first searching step is one of the automatic mode and the manual mode, and the default mode for the second downloading step is a different one of the automatic mode and the manual mode.

16. The vehicle system of claim 10, wherein the wireless communication device provides the system with the ability to receive communications, including software updates, via a Wi-Fi network, a cellular service network, and a short-range communication network.

17. The vehicle system of claim 16, wherein automatically selecting the wireless network having the highest priority assigned is based on network communications criteria that includes a limit for cumulative wireless network data reception over a time period, and selecting the wireless network having the highest priority is based on at least one of time of day, vehicle location, and signal strength; and
wherein the user interface is menu driven to provide separate menus for each of the plurality of wireless networks, such that the user settings for each of the wireless networks in either the automatic mode or the manual mode for each of the first searching step and the second downloading step are manually set via separate windows for each of the plurality of wireless networks.

18. A method for configuring a processor based controller to implement software updates for a vehicle system that includes a wireless communication device providing the vehicle system with the ability to receive communications, including the software updates, via one or more wireless networks of a plurality of wireless networks, the method comprising:
searching for software updates to the vehicle system in a first searching step, and downloading software updates to the vehicle system in a second downloading step that are discovered in the first searching step, wherein each of the first searching step and the second downloading step can be implemented in either an automatic mode or a manual mode, wherein:
in the automatic mode, automatically searching for software updates in the first searching step and automatically downloading software updates in the second downloading step that are discovered in the first searching step, and
in the manual mode, searching for software updates in the first searching step and downloading software updates in the second downloading step that are discovered in the first searching step only upon receiving a manually entered instruction to proceed;
receiving user settings from a user interface, the user settings including a separate and independent setting for each of the plurality of wireless networks in either the automatic mode or the manual mode for each of the first searching step and the second downloading step;
prompting a user to manually search for software updates and/or downloading software updates if the first searching step and/or second downloading step are set in the manual mode; and
inputting, in the user interface, a priority for each of the plurality of wireless networks, and automatically selecting a wireless network having a highest priority to search for software updates and/or download software updates that are discovered if the first searching step and/or the second downloading step are set in the automatic mode for the wireless network having the highest priority,
determining whether the first searching step is set to one of the automatic mode and the manual mode and the second downloading step is set to a different one of the automatic mode and the manual mode, and if so, performing the first searching step on one of the plurality of wireless networks and performing the second downloading step on a different one of the plurality of wireless networks.

* * * * *